US009014964B2

(12) United States Patent
Kuo

(10) Patent No.: US 9,014,964 B2
(45) Date of Patent: Apr. 21, 2015

(54) NAVIGATION APPARATUS CAPABLE OF PROVIDING REAL-TIME NAVIGATION IMAGES

(75) Inventor: Hsing-Ping Kuo, Taipei (TW)

(73) Assignee: Mitac International Corp., Hsinchu Hsien (TW)

( * ) Notice: Subject to any disclaimer, the term of this patent is extended or adjusted under 35 U.S.C. 154(b) by 885 days.

(21) Appl. No.: 13/090,415

(22) Filed: Apr. 20, 2011

(65) Prior Publication Data

US 2011/0264367 A1  Oct. 27, 2011

(30) Foreign Application Priority Data

Apr. 22, 2010 (TW) .............................. 99112666 A

(51) Int. Cl.
| | | |
|---|---|---|
| *G01C 21/34* | (2006.01) | |
| *G01C 21/36* | (2006.01) | |
| G01C 21/00 | (2006.01) | |
| G01C 21/26 | (2006.01) | |

(52) U.S. Cl.
CPC ............ *G01C 21/3647* (2013.01); *G01C 21/00* (2013.01); *G01C 21/36* (2013.01); *G01C 21/3611* (2013.01); *G01C 21/26* (2013.01)

(58) Field of Classification Search
CPC ........ G01C 21/26; G01C 21/36; G01C 21/00; G01C 21/3611; G01C 21/3647; G08G 1/096827; G08G 1/123; G08G 1/096811; G06Q 10/08; G01S 5/0027; G01S 2205/008
USPC ............ 348/113, 157, E7.085; 701/472, 501, 701/533, 532, 494, 428, 467, 538, 461, 409, 701/526, 436, 431; 715/771; 606/90, 86 R
See application file for complete search history.

(56) References Cited

U.S. PATENT DOCUMENTS

| | | | | |
|---|---|---|---|---|
| 2009/0005961 | A1* | 1/2009 | Grabowski et al. | 701/200 |
| 2009/0125223 | A1* | 5/2009 | Higgins | 701/200 |
| 2009/0228204 | A1* | 9/2009 | Zavoli et al. | 701/208 |
| 2010/0030471 | A1* | 2/2010 | Watanabe et al. | 701/217 |
| 2010/0049439 | A1* | 2/2010 | Cho et al. | 701/216 |
| 2010/0250125 | A1* | 9/2010 | Lundberg et al. | 701/208 |
| 2010/0256907 | A1* | 10/2010 | Bye | 701/221 |
| 2010/0268454 | A1* | 10/2010 | Fountain | 701/201 |
| 2011/0032361 | A1* | 2/2011 | Tamir et al. | 348/157 |
| 2011/0117903 | A1* | 5/2011 | Bradley | 455/418 |
| 2011/0178708 | A1* | 7/2011 | Zhang et al. | 701/221 |
| 2011/0190774 | A1* | 8/2011 | Nikolchev et al. | 606/90 |
| 2011/0238308 | A1* | 9/2011 | Miller et al. | 701/216 |
| 2011/0261187 | A1* | 10/2011 | Wang et al. | 348/113 |
| 2012/0191346 | A1* | 7/2012 | Geelen et al. | 701/526 |
| 2013/0096819 | A1* | 4/2013 | Tarnok | 701/428 |
| 2013/0185165 | A1* | 7/2013 | Vanderhook et al. | 705/14.73 |
| 2013/0197801 | A1* | 8/2013 | Geelen et al. | 701/461 |
| 2013/0211719 | A1* | 8/2013 | Boschker et al. | 701/533 |

* cited by examiner

*Primary Examiner* — Behrang Badii
(74) *Attorney, Agent, or Firm* — Vedder Price, P.C.

(57) ABSTRACT

A navigation apparatus is capable of image-capturing and is used to implement a navigation method including the steps of: a) obtaining current location information associated with the navigation apparatus, and location information of a reference target along a planned route that is being traversed; b) capturing real-time navigation images of the planned route according to an image-capture configuration parameter; c) obtaining a display screen position associated with the reference target with reference to the current location information, the target location information, and the image-capture configuration parameter; and d) showing on the display device the navigation images together with a mark corresponding in position to the display screen position.

4 Claims, 5 Drawing Sheets

NAVIGATION APPARATUS CAPABLE OF PROVIDING REAL-TIME NAVIGATION IMAGES

CROSS-REFERENCE TO RELATED APPLICATION

This application claims priority of Taiwanese Application No. 099112666, filed on Apr. 22, 2010.

BACKGROUND OF THE INVENTION

1. Field of the Invention

The present invention relates to a navigation apparatus, more particularly to a navigation apparatus capable of providing real-time navigation images.

2. Description of the Related Art

Conventional navigation devices, when approaching a reference target along a planned route that is being traversed, are generally configured to display a two-dimensional schematic image of the planned route with marks and navigation information thereon. A user has to compare the actual view of the planned route with the schematic image, which may appear very different from the actual view and thus be confusing.

In recent years, several navigation service providers have been creating three-dimensional schematic images of reference targets such as intersections, bridges, and roundabouts for better navigational experiences. However, due to high costs, it has been virtually impossible for the navigation service providers to create a three-dimensional schematic image for every reference target. As a result, navigations toward some reference targets still rely upon two-dimensional schematic images.

Furthermore, since updating of the three-dimensional schematic images in response to removal or reconstruction of geographic objects near the respective reference targets can be costly and time-consuming, navigation toward these reference targets may sometimes be even more confusing.

SUMMARY OF THE INVENTION

Therefore, an object of the present invention is to provide a navigation apparatus capable of alleviating the above drawbacks of the prior art.

Accordingly, a navigation apparatus of the present invention includes:

a navigation unit for providing navigation information associated with a planned route that is being traversed, the navigation information including target location information of a reference target along the planned route;

an inertial navigation system for detecting motions and rotations experienced by the navigation apparatus when the planned route is being traversed and for generating inertial navigation data accordingly;

a location-estimating unit for receiving the inertial navigation data generated by the inertial navigation system, and configured for obtaining current location information associated with the navigation apparatus with reference to the inertial navigation data;

an image-capturing unit operable for capturing real-time navigation images of the planned route according to an image-capture configuration parameter;

an image-processing unit coupled to the image-capturing unit for receiving the navigation images therefrom;

a display device coupled to the image-processing unit; and a position determining unit for obtaining a display screen position associated with the reference target with reference to the current location information, the target location information, and the image-capture configuration parameter, the position determining unit providing the display screen position to the image-processing unit, the image-processing unit controlling the display device to show the navigation images captured by the image-capturing unit together with a mark corresponding in position to the display screen position.

Another object of the present invention is to provide a navigation method to be implemented by a navigation apparatus that is capable of image-capturing.

Accordingly, the navigation method of the present invention includes the steps of:

a) obtaining current location information associated with the navigation apparatus, and target location information of a reference target along a planned route that is being traversed;

b) capturing real-time navigation images of the planned route according to an image-capture configuration parameter;

c) obtaining a display screen position associated with the reference target with reference to the current location information, the target location information, and the image-capture configuration parameter; and d) showing on a display device the navigation images together with a mark corresponding in position to the display screen position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
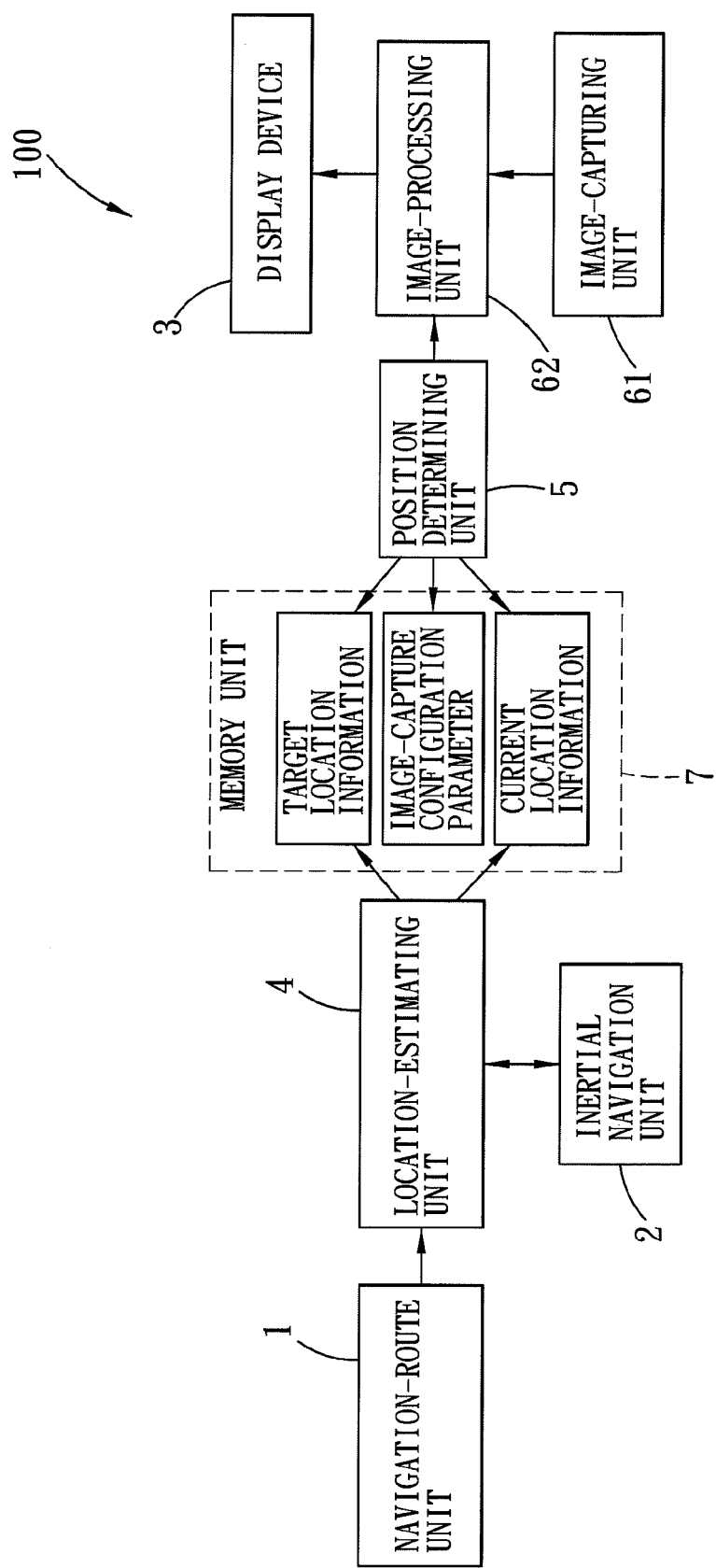
FIG. 1 is a block diagram of the preferred embodiment of a navigation apparatus according to the present invention.

Referring to FIG. 1, the preferred embodiment of a navigation apparatus 100 according to the present invention is installed in a motor vehicle, and includes a navigation unit 1, an inertial navigation system 2, a display device 3, a location-estimating unit 4, a position determining unit 5, an image-capturing unit 61, an image-processing unit 62, and a memory unit 7.

The navigation unit 1 is configured to obtain a planned route between a current location, which is obtained from Global Positioning System (GPS) signals received thereby, and a user-input destination location. The planned route may be an optimal route or a shortest route, depending on user configuration, and is to be traversed by the motor vehicle. The navigation unit 1 is coupled to the location-estimating unit 4 for providing navigation information associated with the planned route thereto. When the motor vehicle is traversing the planned route, the navigation information includes target location information of a reference target to which the motor vehicle is approaching along the planned route.

The inertial navigation system 2 is coupled to the location-estimating unit 4 for receiving an inertia-detect signal therefrom, is responsive to the inertia-detect signal so as to detect motions and rotations experienced by the navigation apparatus 100 when the planned route is being traversed by the motor vehicle, is configured to generate inertial navigation data accordingly, and is configured to provide the inertial navigation data to the location-estimating unit 4.

Figure 2:
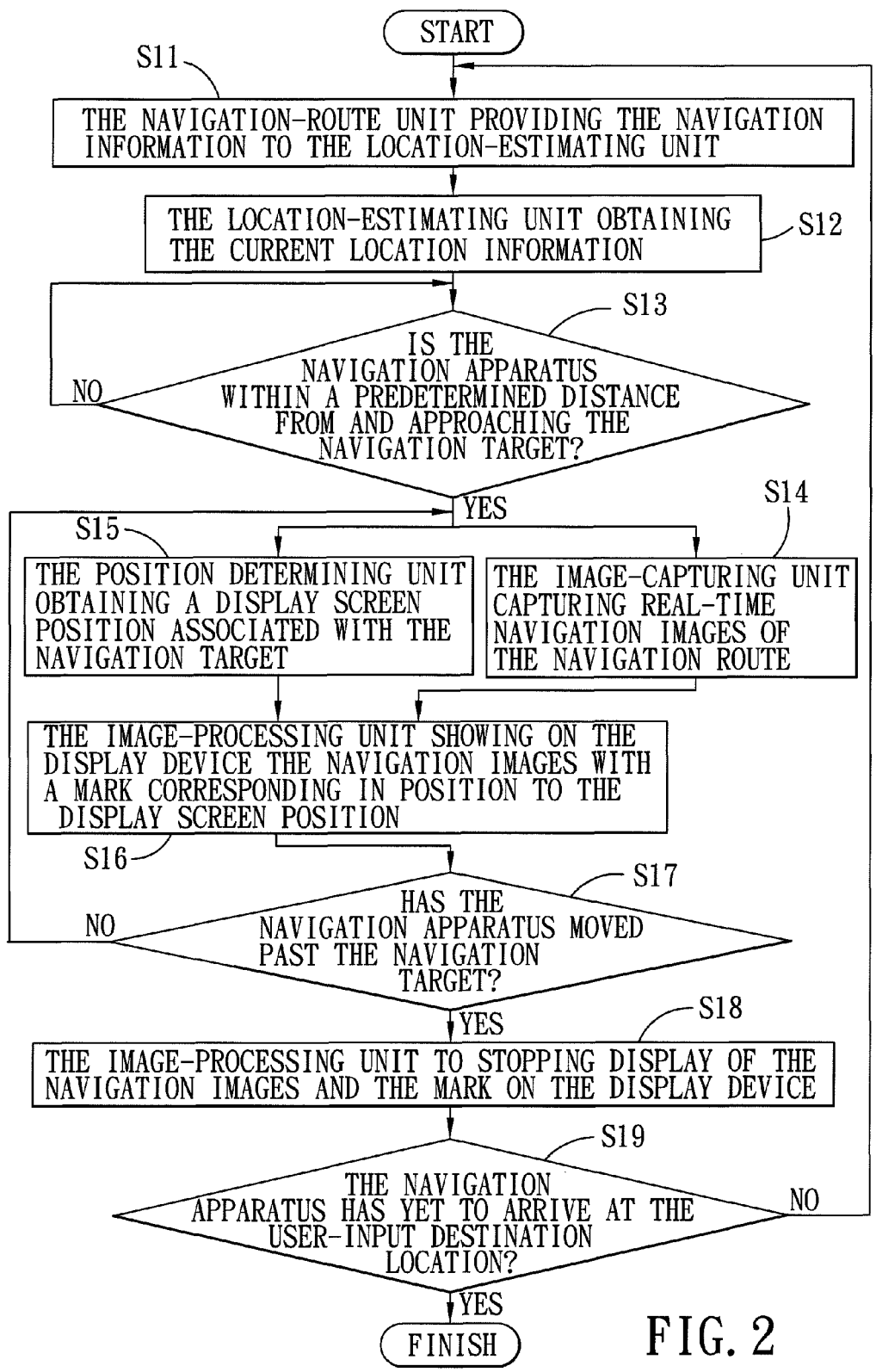
FIG. 2 is a flowchart illustrating steps of the preferred embodiment of a navigation method according to the present invention.

Referring to FIG. 2, the location-estimating unit 4, the position determining unit 5, the image-capturing unit 61, the image-processing unit 62, and the memory unit 7 will be described hereinafter in connection with the preferred embodiment of a navigation method implemented by the navigation apparatus 100, according to the present invention.

Figure 3:
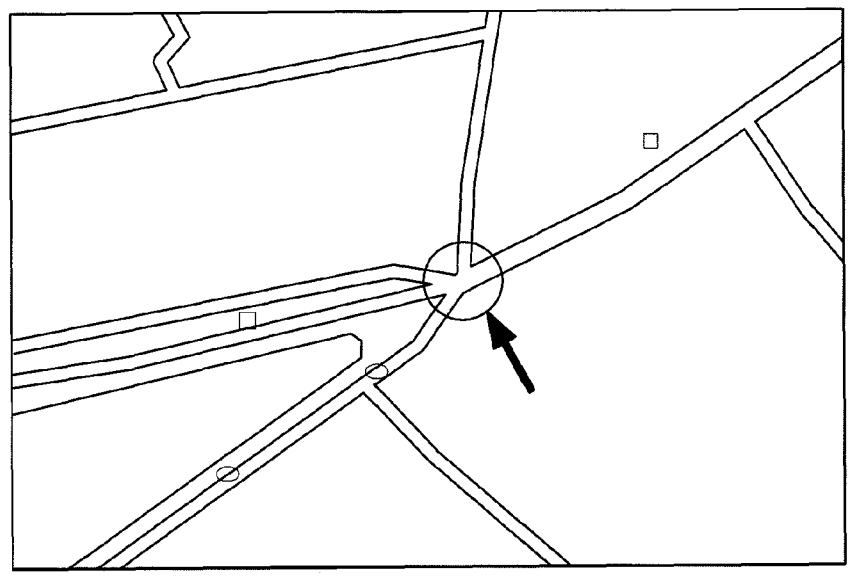
FIG. 3 is a schematic diagram illustrating a reference target along a planned route.

In step S11, the navigation unit 1 is configured to provide the navigation information, which includes the target location information of the reference target, to the location-estimating unit 4. In this embodiment, the reference target is a junction of roads indicated by the solid arrow in FIG. 3.

In step S12, the location-estimating unit 4 is operable to generate the inertia-detect signal so as to cause the inertial navigation system 2 to generate the inertial navigation data, is operable to receive the inertial navigation data from the inertial navigation system 2, and is configured to obtain current location information associated with the navigation apparatus 100 with reference to the inertial navigation data. The location-estimating unit 4 is further coupled to the memory unit 7 to provide the current location information and the target location information thereto for storage therein.

It is to be noted that the target location information includes coordinates and altitude of the reference target, and that the current location information includes coordinates, altitude, and navigation bearing of the navigation apparatus 100.

In step S13, the location-estimating unit 4 is configured to compare a difference in the coordinates included in the target location information and the current location information. If the difference in the coordinates is indicative of the navigation apparatus 100 being within a predetermined distance, say 100 m, from and approaching the reference target, the navigation apparatus 100 is configured to perform steps S14 and S15.

Figure 4:
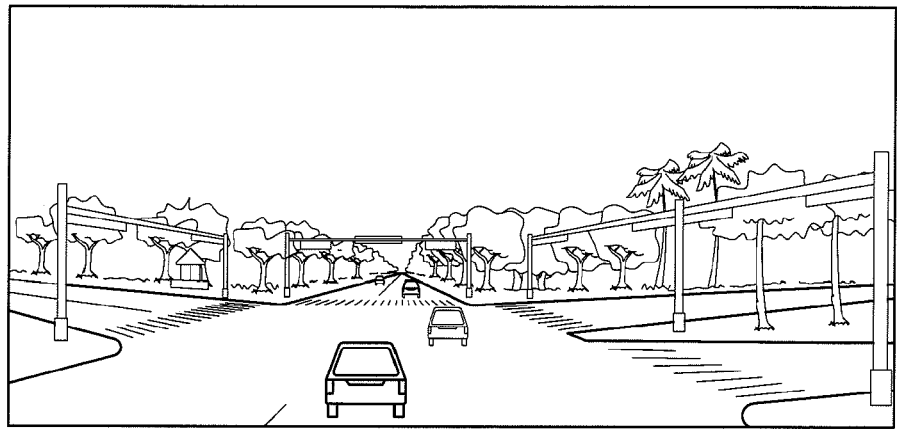
FIG. 4 is a schematic diagram illustrating a navigation image captured by an image-capturing unit of the navigation apparatus.

In step S14, the image-capturing unit 61 is controlled to capture real-time navigation images of the planned route (see FIG. 4) according to an image-capture configuration parameter, which is pre-stored in the memory unit 7 and specifies the focal length at which the navigation images are captured by the image-capturing unit 61. The image processing unit 62 is coupled to the image-capturing unit 61 for receiving the navigation images therefrom, and is coupled to the display device 3.

In step S15, the position determining unit 5, which is coupled to the memory unit 7, receives the target location information, the current location information, and the image-capture configuration parameter from the memory unit 7, and is configured to obtain a display screen position associated with the reference target with reference to the target location information, the current location information, and the image-capture configuration parameter.

Figure 5:
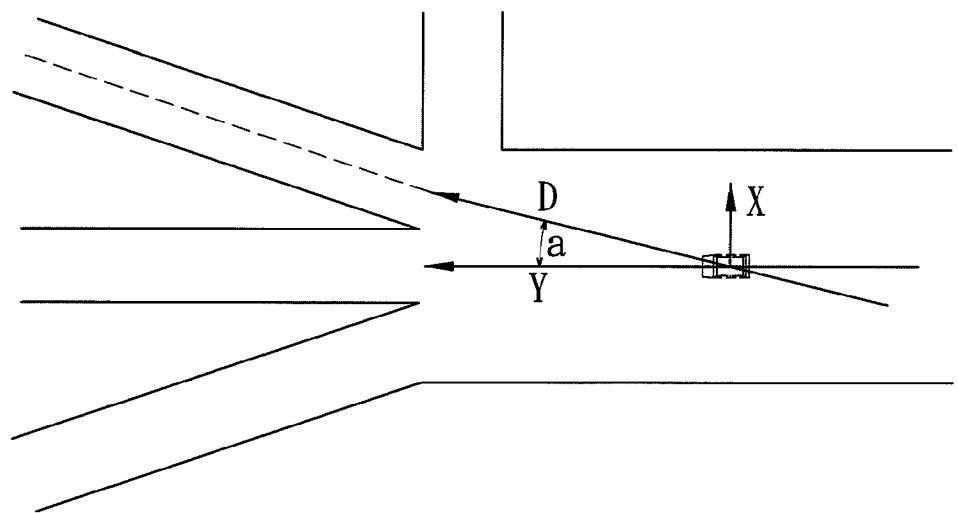
FIG. 5 is a schematic diagram to illustrate a navigation bearing of a motor vehicle, in which the navigation apparatus is disposed, approaching the reference target, and a distance between the motor vehicle and the reference target.

Referring to FIG. 5, the dashed-line shows a portion of the planned route being traversed by the motor vehicle. "D" is a distance between the navigation apparatus 100 and the reference target, and is the difference in coordinates thereof. "a" is an angle obtained from the navigation bearing of the navigation apparatus 100 with reference to the coordinates of the navigation apparatus 100 and the reference target. The position determining unit 5 is configured to calculate "Y" and "X" using the equations of:

$$X = D \times \sin(a)$$

$$Y = D \times \cos(a)$$

Figure 6:
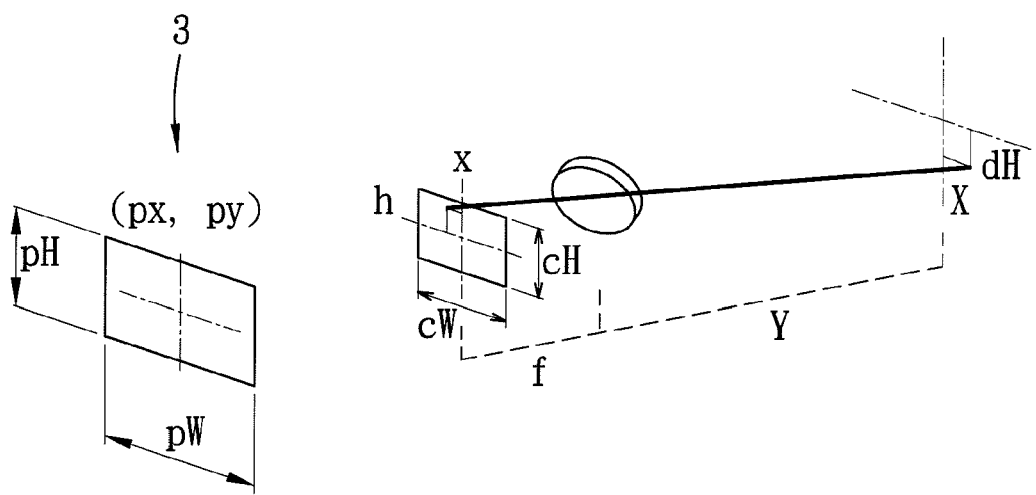
FIG. 6 is a diagram to illustrate a relationship between the reference target and a display screen position.

Referring to FIG. 6, "dH" is a difference in altitude between the reference target and the navigation apparatus 100, "f" is the focal length at which the navigation images are captured by the image-capturing unit 61, "(x, h)" is the Cartesian coordinates associated with a sensor pixel of the image-capturing unit 61 that corresponds to the reference target, and "(px, py)" is the Cartesian coordinates associated with a display pixel of a display panel of the display device 3 that corresponds to the reference target.

The position determining unit 5 is configured to obtain "dH" by comparing the altitudes of the reference target and the navigation apparatus 100, and to obtain "(x, h)" using the equations of:

$$x = f \times X/Y$$

$$h = f \times dH/Y$$

Finally, the position determining unit 5 is configured to obtain "(px, py)" using the equations of:

$$px = x \times pW/cW$$

$$py = h \times pH/cH$$

Figure 7:
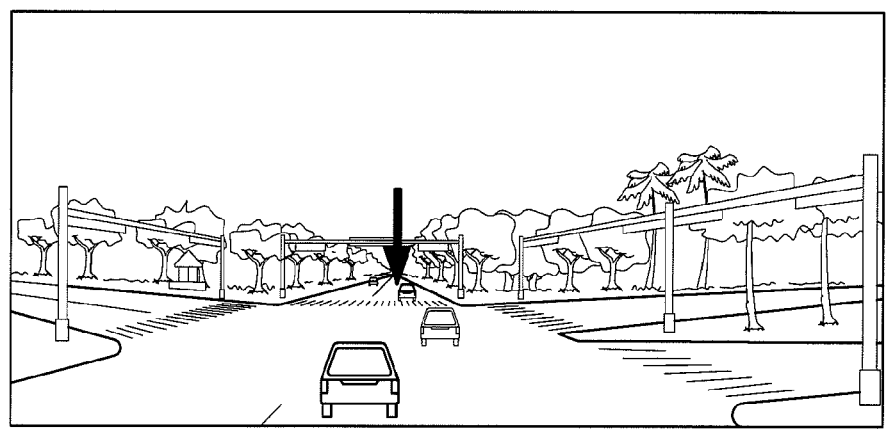
FIG. 7 is a schematic diagram illustrating display of the navigation image on a display device together with a mark that corresponds in position to the display screen position.

In step S16, the positioning determining unit 5, which is further coupled to the image-processing unit 62, controls the image-processing unit 62 to show on the display panel of the display device 3 the navigation images captured by the image-capturing unit 61 together with a mark corresponding in position to the display screen position (see FIG. 7).

It is worth noting that the position determining unit 5 is configured to obtain a display screen position for each navigation image such that the mark corresponds in position to the display screen position in each navigation image.

In step S17, the location-estimating unit 4 is configured to determine whether the navigation apparatus 100 has moved past the reference target according to the difference in the coordinates included in the target location information and the current location information, and to proceed to step S18 if affirmative.

In step S18, the position determining unit 5 is configured to control the image-processing unit 62 to stop display of the navigation images and the mark on the display panel of the display device 3, and to proceed to step S19.

In step S19, the navigation unit 1 is configured to determine whether the navigation apparatus 100 has yet to arrive at the user-input destination location, and to proceed to step S11 for navigation toward a next reference target along the planned route if affirmative.

In summary, the navigation apparatus 100 is operable to perform the navigation method of the preferred embodiment, according to the present invention, for displaying the navigation images together with the mark corresponding in position to the display screen position, which is relatively intuitive and effective even if geographic objects near the respective reference targets undergo changes or are removed.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A navigation method to be implemented by a navigation apparatus that is capable of image-capturing and that has a display device, said navigation method comprising the steps of:
   a) obtaining current location information associated with the navigation apparatus, and location information of a reference target along a planned route that is being traversed;
   b) capturing real-time navigation images of the planned route according to an image-capture configuration parameter, wherein the image-capture configuration parameter specifies the focal length at which the navigation images are captured by the navigation apparatus;
   c) obtaining a display screen position associated with the reference target with reference to the current location information, the target location information, and the image-capture configuration parameter; and
   d) showing on the display device the navigation images together with a mark corresponding in position to the display screen position; wherein:
   the location information includes coordinates and altitude of the reference target;
   the current location information includes coordinates, altitude, and navigation bearing of the navigation apparatus; and
   in step c), the display screen position is obtained from the image-capture configuration parameter, the navigation bearing, a difference in the coordinates included in the location information and the current location information, and a difference in the altitudes included in the location information and the current location information.

2. The navigation method as claimed in claim 1, wherein the navigation apparatus is configured to perform step d) when the difference in the coordinates included in the location information and the current location information is indicative of the navigation apparatus being within a predetermined distance from and approaching the reference target.

3. The navigation method as claimed in claim 2, further comprising the step of:
   e) stopping display of the navigation images and the mark on the display device when the difference in the coordinates included in the location information and the current location information is indicative of the navigation apparatus having moved past the reference target.

4. The navigation method as claimed in claim 1, the navigation apparatus including a memory unit, wherein the current location information and the location information obtained in step a), together with the image-capture configuration parameter, are stored in the memory unit for subsequent use in step c).

* * * * *